(12) United States Patent
Gorbaty et al.

(10) Patent No.: US 8,168,061 B2
(45) Date of Patent: May 1, 2012

(54) PROCESS FOR FLEXIBLE VACUUM GAS OIL CONVERSION USING DIVIDED WALL FRACTIONATION

(75) Inventors: Martin L. Gorbaty, Westfield, NJ (US); Bruce R. Cook, Aurora, IL (US); David T. Ferrughelli, Flemington, NJ (US); Jason B. English, Naperville, IL (US); Steven S. Lowenthal, Flanders, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 540 days.

(21) Appl. No.: 12/459,730

(22) Filed: Jul. 7, 2009

(65) Prior Publication Data

US 2010/0018896 A1     Jan. 28, 2010

Related U.S. Application Data

(60) Provisional application No. 61/135,958, filed on Jul. 25, 2008.

(51) Int. Cl.
*C10G 69/04* (2006.01)
(52) U.S. Cl. ....... 208/55; 208/50; 208/52 R; 208/52 CT; 208/54; 208/67; 208/73; 208/76; 208/113; 208/125; 208/131; 208/132; 208/208 R
(58) Field of Classification Search .............. 208/50, 208/52 R, 52 CT, 54–55, 67, 73, 76, 113–125, 208/131–132
See application file for complete search history.

(56) References Cited

U.S. PATENT DOCUMENTS

| | | |
|---|---|---|
| 2,343,192 A | 2/1944 | Kuhn |
| 4,016,218 A | 4/1977 | Haag et al. |
| 4,230,533 A | 10/1980 | Giroux |
| 4,311,579 A | 1/1982 | Bartholic |
| 4,443,325 A | 4/1984 | Chen et al. |
| 4,569,753 A | 2/1986 | Busch et al. |
| 4,582,569 A | 4/1986 | Jenkins |
| 4,892,644 A | 1/1990 | Choi et al. |
| 4,933,067 A | 6/1990 | Rankel |
| 5,468,369 A | 11/1995 | Muldowney |
| 5,755,933 A | 5/1998 | Ognisty et al. |
| 2007/0034550 A1 | 2/2007 | Hedrick et al. |

FOREIGN PATENT DOCUMENTS

EP     0239074     9/1987

OTHER PUBLICATIONS

Doherty, M.F. et al. (2008). Distillation in Perry's Chemical Engineers' Handbook, 8th ed, McGraw-Hill, 2400 pgs.*

* cited by examiner

*Primary Examiner* — Walter D Griffin
*Assistant Examiner* — Brian McCaig
(74) *Attorney, Agent, or Firm* — Bruce M. Bordelon

(57) ABSTRACT

This invention relates to a process for the selective conversion of vacuum gas oil. The vacuum gas oil is treated in a two step process. The first is thermal conversion and the second is catalytic cracking of the products of thermal conversion. The product slate can be varied by changing the conditions in the thermal and catalytic cracking steps as well as by changing the catalyst in the cracking step. The combined products from thermal and catalytic cracking are separated in a divided wall fractionator.

12 Claims, 6 Drawing Sheets

Comparison of Naphtha and Distillate Yields (Hydrotreated Naphthenic VGO)

PROCESS FOR FLEXIBLE VACUUM GAS OIL CONVERSION USING DIVIDED WALL FRACTIONATION

This application claims the benefit of U.S. Provisional Application No. 61/135,958 filed Jul. 25, 2008.

FIELD OF THE INVENTION

This invention relates to a process for the selective conversion of a hydrocarbon feed having a Conradson Carbon Residue content of 0 to 6 wt. % based on the hydrocarbon feed. The hydrocarbon feed is treated in a two step process. The first step is thermal conversion and the second step is catalytic cracking of the bottoms product of the thermal conversion. The product slate can be varied by changing the conditions in the thermal and catalytic cracking steps as well as by changing the catalyst in the cracking step. The combined products from thermal and catalytic cracking are separated in a divided wall fractionator.

BACKGROUND OF THE INVENTION

The upgrading of atmospheric and vacuum residual oils (resids) to lighter, more valuable products has been accomplished by thermal cracking processes such as visbreaking and coking. In visbreaking, a vacuum resid from a vacuum distillation column is sent to a visbreaker where it is thermally cracked. The process conditions are controlled to produce the desired products and minimize coke formation. Vacuum gas oils from the vacuum distillation column are typically sent directly to a fluidized catalytic cracking ("FCC") unit.

Conversion in visbreakers is a function of asphaltene and Conradson Carbon Residue ("CCR") content of the feed. Generally, lower levels of asphaltene and CCR are favorable to visbreaking. Higher values lead to increased coking and lower yields of light liquids. The products from the visbreaker have reduced viscosity and pour points, and include naphtha, visbreaker gas oils and visbreaker residues. The bottoms from the visbreaker are heavy oils such as heavy fuel oils. Various processing schemes have been incorporated with visbreakers/

Petroleum coking relates to processes for converting resids to petroleum coke and hydrocarbon products having atmospheric boiling points lower than that of the feed. Some coking processes, such as delayed coking, are batch processes where the coke accumulates and is subsequently removed from a reactor vessel. In fluidized bed coking, for example fluid coking and FLEXICOKING® (available from Exxon-Mobil Research and Engineering Co., Fairfax, Va.), lower boiling products are formed by the thermal decomposition of the feed at elevated reaction temperatures, typically about 480 to 590° C. (896 to 1094° F.), using heat supplied by burning some of the fluidized coke particles.

Following coking, the lower boiling hydrocarbon products, such as coker gas oil, are separated in a separation region and conducted away from the process for storage or further processing. Frequently, the separated hydrocarbon products contain coke particles, particularly when fluidized bed coking is employed. Such coke particles may range in size upwards from submicron to several hundred microns in diameter, but typically are in the submicron to about 50 micron diameter range. It is generally desirable to remove particles larger than about 25 microns in diameter to prevent fouling of downstream catalyst beds used for further processing. Filters, located downstream of the separation zone, are employed to remove coke from the products. Solid hydrocarbonaceous particles present in the separated lower boiling hydrocarbon products may physically bind to each other and the filters, thereby fouling the filter and reducing filter throughput. Fouled filters must be back-washed, removed and mechanically cleaned, or both to remove the foulant.

For purposes of separating components in a petroleum stream, distillation remains the most frequently used separation process. It is well known that distillation is both inefficient and energy intensive. It is now known that a divided wall distillation or fractionation column having a partition separating one side of the distillation column from the other can be used for distillation separations. Examples of such divided wall distillation are described in U.S. Pat. Nos. 4,230,533, 4,582,569 and 5,755,933.

However, there is a need in the industry for improved processes for treating high boiling range hydrocarbon feeds such as vacuum gas oils in order to increase the production of distillate boiling range products produced from these hydrocarbon feeds.

SUMMARY OF THE INVENTION

A preferred embodiment of the present invention is a thermal and catalytic conversion process for converting a hydrocarbon feed having a Conradson Carbon Residue ("CCR") content of from 0 to 6 wt. %, based on the hydrocarbon feed, which comprises:

a) processing the hydrocarbon feed in a thermal conversion zone under effective thermal conversion conditions to produce a thermally cracked product;

b) conducting at least a portion of the thermally cracked product to a fractionator containing a divided wall;

c) using the divided wall portion of the fractionator to separate a thermally cracked bottoms;

d) conducting at least a portion of the thermally cracked bottoms to a fluid catalytic cracking reactor;

e) catalytically converting the thermally cracked bottoms under effective fluid catalytic cracking conditions to produce a catalytically cracked product;

f) conducting the catalytically cracked product to the fractionator at a point below the uppermost portion of the divided wall wherein a portion of the catalytically cracked product is co-mingled with a thermally cracked distillate and a thermally cracked naphtha; and g) separating a co-mingled naphtha, a co-mingled distillate, and a catalytically cracked bottoms from the fractionator;

wherein the catalytically cracked bottoms is segregated from the thermally cracked bottoms utilizing the divided wall portion of the fractionator.

Another preferred embodiment of the present invention is a thermal and catalytic conversion process for converting a hydrocarbon feed having a Conradson Carbon Residue ("CCR") content of from 0 to 6 wt. %, based on the hydrocarbon feed, which comprises:

a) processing the hydrocarbon feed in a thermal conversion zone under effective thermal conversion conditions to produce a thermally cracked product;

b) conducting at least a portion of the thermally cracked product to a fractionator containing a divided wall;

c) using the divided wall portion of the fractionator to separate a thermally cracked bottoms;

d) conducting at least a portion of the thermally cracked bottoms to a fluid catalytic cracking reactor;

e) catalytically converting the thermally cracked bottoms under effective fluid catalytic cracking conditions to produce a catalytically cracked product;

f) conducting the catalytically cracked product to the fractionator at a point below the uppermost portion of the divided wall wherein a portion of the catalytically cracked product is co-mingled with a thermally cracked naphtha; and g) separating a co-mingled naphtha, a thermally cracked distillate, a catalytically cracked distillate, and a catalytically cracked bottoms from the fractionator;

wherein the thermally cracked distillate is segregated from the catalytically cracked distillate, and the catalytically cracked bottoms is segregated from the thermally cracked bottoms utilizing the divided wall portion of the fractionator.

Yet another preferred embodiment of the present invention is a thermal and catalytic conversion process for converting a hydrocarbon feed having a Conradson Carbon Residue ("CCR") content of from 0 to 6 wt. %, based on the hydrocarbon feed, which comprises:

a) processing the hydrocarbon feed in a thermal conversion zone under effective thermal conversion conditions to produce a thermally cracked product;

b) conducting at least a portion of the thermally cracked product to a fractionator containing a divided wall;

c) using the divided wall portion of the fractionator to separate a thermally cracked bottoms;

d) conducting at least a portion of the thermally cracked bottoms to a fluid catalytic cracking reactor;

e) catalytically converting the thermally cracked bottoms under effective fluid catalytic cracking conditions to produce a catalytically cracked product;

f) conducting the catalytically cracked product to the fractionator at a point below the uppermost portion of the divided wall; and g) separating a thermally cracked naphtha, a catalytically cracked naphtha, a thermally cracked distillate, a catalytically cracked distillate, and a catalytically cracked bottoms from the fractionator;

wherein the thermally cracked naphtha is segregated from the catalytically cracked naphtha, the thermally cracked distillate is segregated from the catalytically cracked distillate, and the catalytically cracked bottoms is segregated from the thermally cracked bottoms utilizing the divided wall portion of the fractionator.

DETAILED DESCRIPTION OF THE INVENTION

Feedstock

Figure 1:
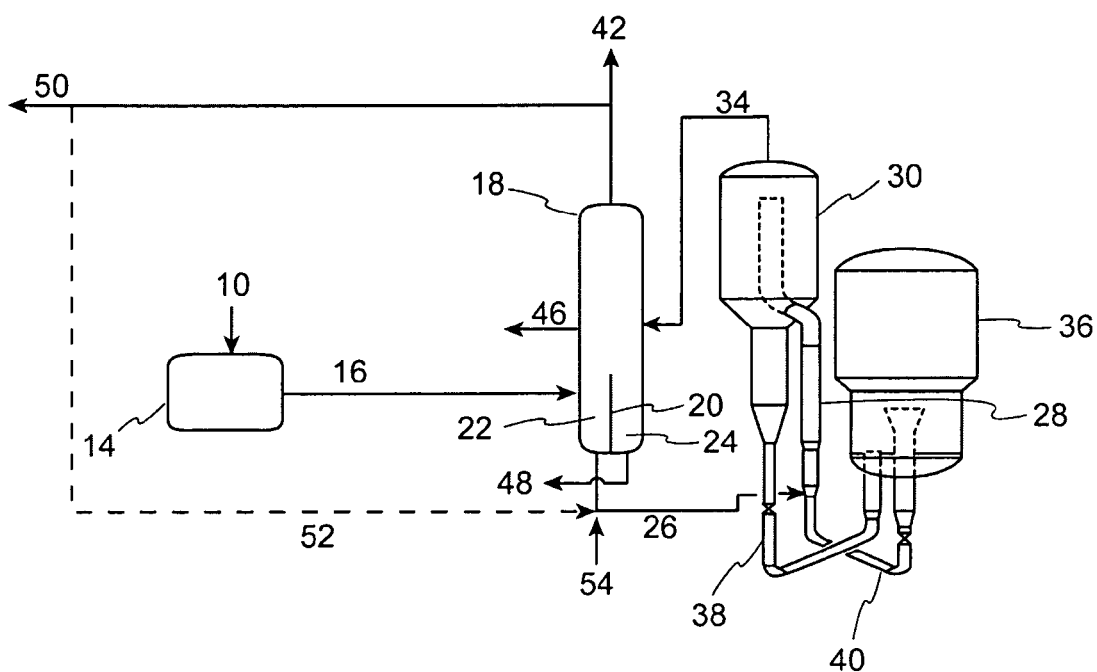
FIG. 1 is a flow diagram illustrating an embodiment of the process of the invention in which a divided wall is used to separate co-mingled thermally cracked and catalytically cracked distillate and co-mingled thermally cracked and catalytically cracked naphtha from thermally cracked and catalytically cracked bottoms products.

The feedstock to the present thermal conversion process is a hydrocarbon feed having a Conradson Carbon Residue ("CCR") content of from 0 to 6 wt. % based on the hydrocarbon feed. The Conradson Carbon Residue ("CCR") content of a stream is defined herein as equal to the value as determined by test method ASTM D4530, Standard Test Method for Determination of Carbon Residue (Micro Method). Examples of preferred feeds include vacuum gas oils and hydrotreated vacuum gas oils. By vacuum gas oil (VGO) is meant a distillate fraction having a nominal boiling range at atmospheric pressure of about 343° C. to about 566° C. (650° F. to 1050° F.) as measured by ASTM D 2887. The normal source of vacuum gas oils are vacuum distillation towers but the precise source of the VGO is not important. VGOs tend to be low in CCR content and metals content. CCR is determined by standard test method ASTM D189. Hydrocarbon feeds having >1 wt. % CCR may also include a resid component. The feedstock to the thermal cracker may be heated to the reaction temperature in the thermal cracker by an independent furnace or by the feed furnace to the FCC unit itself.

Thermal Conversion

The hydrocarbon feed having a CCR of about 0 to 6 wt % is first thermally converted in a thermal conversion zone. VGOs fractions tend to be low in CCR and metals, and when the hydrocarbon feed contains a substantial about of VGO fraction hydrocarbons, the thermal conversion zone can be operated at more severe conditions while limiting the production of excessive coke, gas make, toluene insolubles, or reactor wall deposits as compared to a typical vacuum resid feed that is thermally cracked. The conditions for thermal conversion zone to achieve maximum distillate production will vary depending on the nature of the products desired. In general, the thermal conversion zone may be operated at temperatures and pressures to maximize the desired product without making and depositing undesirable amounts of coke, coke precursors or other unwanted carbonaceous deposits in the thermal conversion zone. These conditions are determined experimentally and are generally expressed as a severity which is dependent upon both the temperature and residence time of the hydrocarbon feed in the thermal conversion zone.

Severity has been described as equivalent reaction time (ERT) in U.S. Pat. Nos. 4,892,644 and 4,933,067 which patents are incorporated by reference herein in their entirety. As described in U.S. Pat. No. 4,892,644, ERT is expressed as a time in seconds of residence time at a fixed temperature of 427° C., and is calculated using first order kinetics. The ERT range in the U.S. Pat. No. 4,892,644 patent is from 250 to 1500 ERT seconds at 427° C., more preferably at 500 to 800 ERT seconds. As noted by patentee, raising the temperature causes the operation to become more severe. In fact, raising the temperature from 427° C. to 456° C. leads to a five fold increase in severity.

In the present invention, a similar methodology is used to determine severities which are expressed in equivalent seconds at 468° C. (as compared to the 427° C. used in U.S. Pat. No. 4,892,644). In applicants' process, severities are in the range of 25-450 equivalent seconds at 468° C. Because applicants use a feed that is low in CCR, the present process can operate at severities higher than those described for visbreaking of a vacuum resid. The low CCR hydrocarbon feeds utilized herein have a lower tendency to form wall deposits and coke, and minimize the yield of poor quality naphthas that are produced in the thermal conversion.

Depending on the products desired, the skilled operator will control conditions including temperature, pressure, residence times and feed rates to achieve the desired product distribution. The type of thermal cracking unit may vary. It is preferred that the unit be run in a continuous mode.

Fractionation

The thermally cracked product from the thermal conversion zone is conducted to a fractionator. The process of the invention utilizes a divided wall fractionator. Divided wall fractionators are described for example in U.S. Pat. No. 4,230,533. The divided wall is a partition that separates the typical distillation tower (fractionator) into two separate distillation zones. The properties of the products separated in the fractionator (distillation tower) are in part dependent on the height of the divided wall within the distillation tower. The main feedstream(s) to the fractionator will enter the fractionator at a location below the top of the divided wall. The feed will be fractionated in the distillation zone (chamber) formed by that side of the divided wall. The distillation tower itself, including the separate chambers formed by the divided wall, will contain a plurality of distillation means having known theoretical plates for separating liquids based on boiling points. Above the top of the divided wall, vapors and liquids are co-mingled within the distillation tower. Various co-mingled product streams may be removed at varying heights from the distillation tower as desired by the operator. Light streams, including $C_4$-hydrocarbons, may be removed at the top of the distillation tower.

In one embodiment, if the thermally cracked and catalytic cracking product(s) to be recovered separately are high boiling (for example, boiling above 343° C.), then the height of the divided wall will be low compared to the height of the distillation tower itself, i.e., the height of the divided wall will be from about 25% to 50% of the overall active height of the fractionator itself. Feed to the fractionator will enter the fractionator at a point below the top of the divided wall, or in the alternative, will enter the fractionator into the other chamber of the divided wall and heavy products can be separated and descend to the bottom portion of the fractionator. In this manner, separated bottoms streams can be obtained. Products above the top of the divided wall are lower boiling and will be co-mingled.

In another embodiment, if the height of the divided wall is raised to the middle portion of the distillation tower, e.g., the height of the divided wall will be from about 33% to about 66% of the overall active height of the distillation tower, then the separate chambers formed by the divided wall within the distillation tower can be used to recover separate thermally cracked and catalytically cracked distillate products. By distillate is meant hydrocarbons with boiling ranges such as diesels, heating oils, kerosenes and the like. Feeds to the distillation tower can thus be separated into separate distillate product streams using the divided wall. For example, this allows segregation of relatively high cetane number distillate from thermal cracking from the relatively low cetane number distillate obtained from FCC.

In yet another embodiment, if the height of the divided wall is raised near the top of the distillation tower, e.g., the height of the divided wall is from about 75% to about 95% of the overall active height of the distillation tower, then the separate chambers formed by the divided wall can be used to recover not only separate bottoms products and distillate products but also naphtha streams. By naphtha is meant low boiling streams having boiling points in the range of about 15 to about 210° C. (59° F. to 430° F.). In one embodiment, naphthas obtained from the thermal conversion zone and can be segregated from the catalytically cracked naphthas. Naphthas from thermal cracking are more paraffinic and can be further processed into olefins while naphthas from catalytic cracking are more aromatic and may be blended directly into gasolines. Thus feeds to the distillation tower can also be separated into separate naphtha products as well as separate distillate and separate bottoms products. It is preferred that the top of the divided wall contain enough space at the top of the distillation tower so that a stream (preferably containing naphtha and light ends) can be removed from the distillation tower.

FCC Processing

In one embodiment, the thermally cracked bottoms product from the fractionator is sent to a FCC reactor for catalytic cracking into lower boiling products. If the fraction of the thermally cracked product boiling above about 343° C. (650° F.) contains undesirable amounts of sulfur and/or nitrogen containing contaminants, then that fraction may optionally be hydrotreated prior to being sent to the FCC reactor. As mentioned previously, it is also an option that the starting VGO may be sent to a hydrotreater to remove at least part of the sulfur and nitrogen prior to being processed in the thermal conversion unit. In an embodiment, at least a portion of the 343° C.+ product fraction obtained from the thermal conversion zone is contacted with a hydrotreating catalyst under conditions effective to remove at least a portion of the sulfur and/or nitrogen contaminants to produce a hydrotreated fraction. Hydrotreating catalysts suitable for use herein are those containing at least one Group 6 (based on the IUPAC Periodic Table having Groups 1-18) metal and at least one Groups 8-10 metal, including mixtures thereof. Preferred metals include Ni, W, Mo, Co and mixtures thereof. These metals or mixtures of metals are typically present as oxides or sulfides on refractory metal oxide supports. The mixture of metals may also be present as bulk metal catalysts wherein the amount of metal is 30 wt. % or greater, based on catalyst.

Suitable metal oxide supports include oxides such as silica, alumina, silica-alumina or titania, preferably alumina. Preferred aluminas are porous aluminas such as gamma or eta. The acidity of metal oxide supports can be controlled by adding promoters and/or dopants, or by controlling the nature of the metal oxide support, e.g., by controlling the amount of silica incorporated into a silica-alumina support. Examples of promoters and/or dopants include halogen, especially fluorine, phosphorus, boron, yttria, rare-earth oxides and magnesia. Promoters such as halogens generally increase the acidity of metal oxide supports while mildly basic dopants such as yttria or magnesia tend to decrease the acidity of such supports.

It should be noted that bulk catalysts typically do not include a support material, and the metals are not present as an oxide or sulfide but as the metal itself. These catalysts typically include metals within the range described above in relation to bulk catalyst and at least one extrusion agent. The amount of metals for supported hydrotreating catalysts, either individually or in mixtures, ranges from 0.5 to 35 wt. %, based on catalyst. In the case of preferred mixtures of Group 6 and Groups 8-10 metals, the Group 8-10 metals are present in amounts of from 0.5 to 5 wt. %, based on catalyst and the Group 6 metals are present in amounts of from 5 to 30 wt. %. The amounts of metals may be measured by atomic absorption spectroscopy, inductively coupled plasma-atomic emission spectrometry or other methods specified by ASTM for individual metals. Non-limiting examples of suitable commercially available hydrotreating catalysts include RT-721, KF-840, KF-848, and Sentinel™. Preferred hydrotreating catalysts are low acidity, high metals content catalysts including KF-848 and RT-721.

In preferred embodiments, the thermally cracked bottoms fraction is subjected to hydrotreating conditions at temperatures of about 280° C. to about 400° C. (536 to 752° F.), more preferably about 300° C. to about 380° C. (572 to 716° F.), and at pressures of about 1,480 to about 20,786 kPa (200 to 3,000 psig), more preferably about 2,859 to about 13,891 kPa (400 to 2,000 psig). In other preferred embodiments, the space velocity in the hydrotreating zone is from about 0.1 to about 10 liquid hourly space velocity ("LHSV", dimensionless), more preferably from about 0.1 to about 5 LHSV. Hydrogen treat gas rates of from about 89 to about 1,780 $m^3/m^3$ (500 to 10,000 scf/B), more preferably 178 to 890 $m^3/m^3$ (1,000 to 5,000 scf/B) may be utilized in the hydrotreating zone. After hydrotreating, the hydrotreated fraction is sent to a FCC reactor for further processing in accordance with this embodiment of the invention.

A conventional FCC process includes a riser reactor and a regenerator wherein petroleum feed is injected into the reaction zone in the riser containing a bed of fluidized cracking catalyst particles. The catalyst particles typically contain zeolites and may be fresh catalyst particles, catalyst particles from a catalyst regenerator or some combination thereof. Gases that may be inert gases, hydrocarbon vapors, steam or some combination thereof are normally employed as lift gases to assist in fluidizing the hot catalyst particles.

Catalyst particles that have contacted feed produce product vapors and catalyst particles containing strippable hydrocarbons as well as coke. The catalyst exits the reaction zone as spent catalyst particles and is separated from the reactor's effluent in a separation zone. The separation zone for separating spent catalyst particles from reactor effluent may employ separation devices such as cyclones. Spent catalyst particles are stripped of strippable hydrocarbons using a stripping agent such as steam. The stripped catalyst particles are then sent to a regeneration zone in which any remaining hydrocarbons are stripped and coke is removed. In the regeneration zone, coked catalyst particles are contacted with an oxidizing medium, usually air, and coke is oxidized (burned) at high temperatures such as 650 to 760° C. (1202 to 1400° F.). The regenerated catalyst particles are then passed back to the reactor riser.

FCC catalysts may be amorphous, e.g., silica-alumina, crystalline, e.g., molecular sieves including zeolites, or mixtures thereof. A preferred catalyst particle comprises (a) an amorphous, porous solid acid matrix, such as alumina, silica-alumina, silica-magnesia, silica-zirconia, silica-thoria, silica-beryllia, silica-titania, silica-alumina-rare earth and the like; and (b) a zeolite such as faujasite. The matrix can comprise ternary compositions, such as silica-alumina-thoria, silica-alumina-zirconia, magnesia and silica-magnesia-zirconia. The matrix may also be in the form of a cogel. Silica-alumina is particularly preferred for the matrix, and can contain about 10 to 40 wt. % alumina. Promoters can be added.

The catalyst zeolite component includes zeolites which are iso-structural to zeolite Y. These include the ion-exchanged forms such as the rare-earth hydrogen and ultrastable (USY) form. The zeolite may range in crystallite size from about 0.1 to 10 microns, preferably from about 0.3 to 3 microns. The amount of zeolite component in the catalyst particle will generally range from about 1 to about 60 wt %, preferably from about 5 to about 60 wt %, and more preferably from about 10 to about 50 wt %, based on the total weight of the catalyst. As discussed, the catalyst is typically in the form of a catalyst particle contained in a composite. When in the form of a particle, the catalyst particle size will typically range from about 10 to 300 microns in diameter, with an average particle diameter of about 60 microns. The surface area of the matrix material after artificial deactivation in steam will typically be ≦350 $m^2/g$, more typically about 50 to 200 $m^2/g$, and most typically from about 50 to 100 $m^2/g$. While the surface area of the catalysts will be dependent on such things as type and amount of zeolite and matrix components used, it will usually be less than about 500 $m^2/g$, more typically from about 50 to 300 $m^2/g$, and most typically from about 100 to 250 $m^2/g$.

The cracking catalyst may also include an additive catalyst in the form of a medium pore zeolite having a Constraint Index (which is defined in U.S. Pat. No. 4,016,218) of about 1 to about 12. Suitable medium pore zeolites include ZSM-5, ZSM-11, ZSM-12, ZSM-22, ZSM-23, ZSM-35, ZSM-48, ZSM-57, SH-3 and MCM-22, either alone or in combination. Preferably, the medium pore zeolite is ZSM-5.

FCC process conditions in the reaction zone include temperatures from about 482° C. to about 740° C. (900 to 1364° F.); hydrocarbon partial pressures from about 10 to about 40 psia (69 to 276 kPa), preferably from about 20 to about 35 psia (138 to 241 kPa); and a catalyst to feed (wt/wt) ratio from about 3 to about 10, where the catalyst weight is total weight of the catalyst composite. The total pressure in the reaction zone is preferably from about atmospheric to about 50 psig (446 kPa). Though not required, it is preferred that steam be concurrently introduced with the feedstock into the reaction zone, with the steam comprising up to about 50 wt %, preferably from about 0.5 to about 5 wt % of the primary feed. Also, it is preferred that vapor residence time in the reaction zone be less than about 20 seconds, preferably from about 0.1 to about 20 seconds, and more preferably from about 1 to about 5 seconds. Preferred conditions are short contact time conditions which include riser outlet temperatures from 482-621° C. (900-1150° F.), pressures from about 0 to about 50 psig (101 to 446 kPa) and reactor riser residence times from about 1 to about 5 seconds.

It is well known that different feeds may require different cracking conditions. In the present process, if it is desired to make the maximum amount of distillate from the hydrocarbon feed, then the thermal conversion zone will be run at maximum temperature consistent with avoiding excess coke or coke precursor make. In an embodiment, at least a portion of the thermally cracked bottoms fraction separated from the thermally cracked product will be sent to a FCC reactor. If it is desired to maximize distillate production, then the FCC catalyst formulation will be optimized for this. It is also known that the location of the injectors within the FCC unit, specifically the location in the FCC reactor riser, also influences the product slate. A further factor is whether there is a blending of different types of feeds to the FCC riser reactor.

Process Schemes

The embodiments of the present invention are further illustrated by the figures herein. FIG. 1 is a flow diagram illustrating an embodiment of the process of the invention in which a divided wall is used to separate co-mingled thermally cracked and catalytically cracked distillate as well as separate co-mingled thermally cracked and catalytically cracked naphtha from thermally cracked bottoms and catalytically cracked bottoms products. In FIG. 1, a hydrocarbon feed with a Conradson Carbon Residue ("CCR") from about 0 to about 6 wt % (10) is conducted to a thermal conversion zone (14). A thermally cracked product (16) is removed from the thermal conversion zone (14) and is conducted to a fractionator (18). In this embodiment, the fractionator (18) contains a divided wall (20) rising from the bottom of fractionator (18) to a height of about 25% to about 50% of the overall active height of fractionator (18) thereby forming separate chambers (22) and (24). The fractionator (18) contains distillation devices (not shown) throughout most of the height of the fractionator including in the separate chambers (22) and (24). These distillation devices are perforated to allow passage of vapors and liquids, and are the means for accomplishing distillation and therefore separation of liquids of differing boiling points. Such distillation devices are well known and are common in fractionation towers.

Continuing with FIG. 1, at least a portion of the thermally cracked bottoms stream (26) is fed to the reactor riser (28) of FCC reactor (30) where it contacts a fluidized catalyst and is cracked into lower boiling products. The FCC products are separated from catalyst in cyclones (not shown) and the separated cracked products (34) are conducted to the fractionator (18). Spent catalyst (38) is sent to the regenerator (36) where it is regenerated under regenerating conditions. Regenerated catalyst is returned to reactor riser (28) through the catalyst return line (40). The fractionator (18) separates products from the FCC reactor (30) as well as products from the thermal conversion zone (14) into a co-mingled naphtha, co-mingled distillate and separate thermally cracked bottoms and catalytically cracked bottoms products. A co-mingled naphtha product (42) is removed from the fractionator (18). In this embodiment, the co-mingled naphtha product (42) is preferably drawn from the overhead of the fractionator in which case the stream may also include $C_4$-hydrocarbons, including $C_3/C_4$ olefins which can be further separated from the naphtha range hydrocarbons. The co-mingled naphtha product (42) may be recovered as product (50) or optionally, a portion of the co-mingled naphtha product stream (52) may be recycled to the reactor riser (28). A co-mingled distillate product (46) is removed from the fractionator and a catalytically cracked bottoms product (48) is removed from the fractionator. In an additional embodiment, the feedstream to the reactor riser (28) may be supplemented by additional FCC hydrocarbon feedstreams (54).

Figure 2:
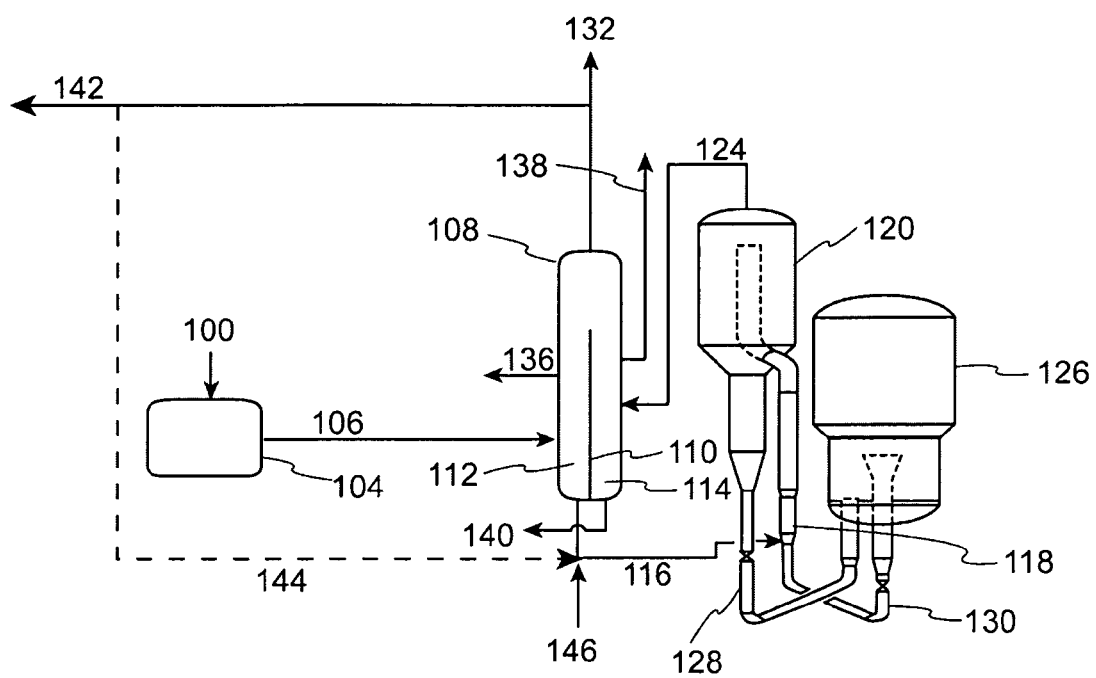
FIG. 2 is a flow diagram illustrating an embodiment of the process of the invention in which a divided wall is used to separate a co-mingled thermally cracked and catalytically cracked naphtha, a thermally cracked distillate, and a catalytically cracked distillate from thermally cracked bottoms product and catalytically cracked bottoms products. A portion of the co-mingled thermally cracked and catalytically cracked naphtha removed from the divided wall fractionator may optionally be recycled back to the FCC reactor.

FIG. 2 is a flow diagram illustrating an embodiment of the process of the invention in which a divided wall is used to separate a co-mingled thermally cracked and catalytically cracked naphtha, a thermal distillate, and a catalytically cracked distillate from a thermally cracked bottoms product and a catalytically cracked bottoms product. In FIG. 2, a hydrocarbon feed (100) with a Conradson Caron Residue ("CCR") from about 0 to about 6 wt % of the hydrocarbon feed is conducted to a thermal conversion zone (104). A thermally cracked product (106) is removed from the thermal conversion zone (100) and conducted to a fractionator (108). The fractionator (108) contains a divided wall (110) rising from the bottom of fractionator (108) to a height of about 33% to about 66% of the overall active height of the fractionator (108) and thereby forming separate chambers (112) and (114). The fractionator (108) contains a plurality of distillation devices (not shown) throughout most of the height of the fractionator including in the separate chambers (112) and (114). These distillation devices are perforated to allow passage of vapors and liquids, and are the means for accomplishing distillation and therefore separation of liquids of differing boiling points. A thermally cracked bottoms stream (116) is conducted to the reactor riser (118) of an FCC reactor (120) where it contacts a fluidized catalyst and is cracked to lower boiling products. The FCC cracked products are separated from catalyst in cyclones (not shown) and separated cracked products (124) are conducted to fractionator (108). The FCC cracked products enter the fractionator (108) at a point of the fractionator located below the top of divided wall (110). Spent catalyst (128) is sent to the regenerator (126) where it is regenerated under regenerating conditions. Regenerated catalyst is returned reactor riser (118) through the catalyst return line (130). The fractionator (108) separates products from the FCC reactor (120) as well as products from the thermal conversion zone (104) into a co-mingled naphtha comprised of thermally cracked and catalytically cracked naphthas (above the divided wall), a separate thermally cracked distillate, a separate catalytically cracked distillate, and separate catalytically cracked bottoms and thermally cracked bottoms.

A fractionator overhead product (132), comprising $C_4$-hydrocarbons, is removed from the fractionator (108). The co-mingled naphtha product (132) is removed from fractionator (108). In this embodiment, the co-mingled naphtha product (132) is preferably drawn from the overhead of the fractionator in which case the stream may also include $C_4$-hydrocarbons, including $C_3/C_4$ olefins which can be further separated from the naphtha range hydrocarbons. The co-mingled naphtha product (132) may be recovered as product (142) or optionally, a portion of the co-mingled naphtha product (144) may be recycled to reactor riser (118). A thermally cracked distillate product (136) and a catalytically cracked distillate product (138) are removed from the fractionator (108). If the catalyst in the FCC reactor includes ZSM-5, $C_3/C_4$ olefin production may be enhanced by recycling at least a portion of the co-mingled naphtha product (144). In an additional embodiment, the feedstream to the reactor riser (118) may be supplemented by additional FCC hydrocarbon feedstreams (146).

Figure 3:
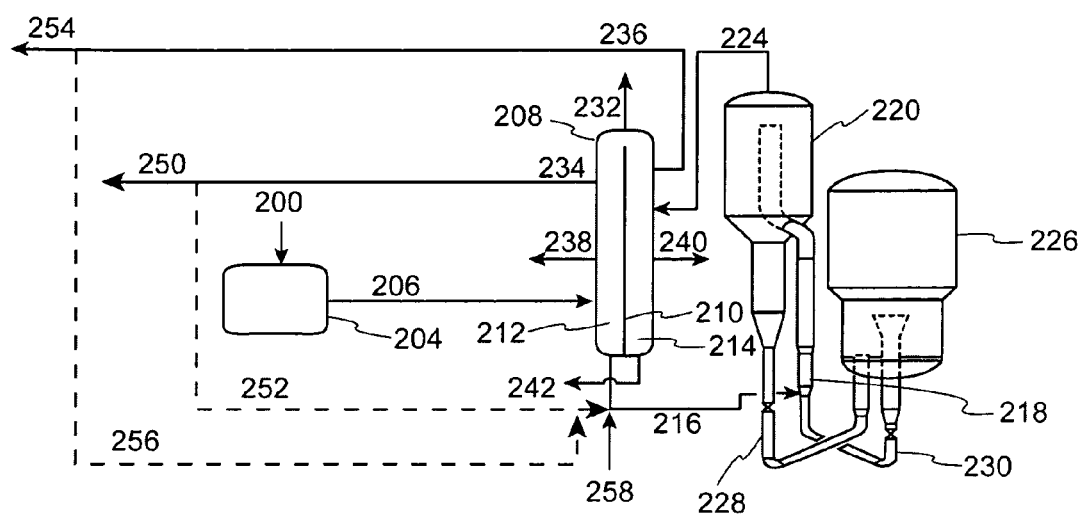
FIG. 3 is a flow diagram illustrating an embodiment of the process of the invention in which a divided wall is used to separate a thermally cracked naphtha, a thermally cracked distillate and a thermally cracked bottoms product from a catalytically cracked naphtha, a catalytically cracked distillate and a catalytically cracked bottoms product. A portion of the thermally cracked and/or catalytically cracked naphtha removed from the divided wall fractionator may recycled back to the FCC reactor.

FIG. 3 is a flow diagram illustrating an embodiment of the process of the invention in which a divided wall is used to separate a thermally cracked naphtha, a thermally cracked distillate and a thermally cracked bottoms product from a catalytically cracked naphtha, a catalytically cracked distillate and a catalytically cracked bottoms product. In FIG. 3, a hydrocarbon feed (200) with a Conradson Caron Residue ("CCR") from about 0 to about 6 wt % of the hydrocarbon feed is conducted to a thermal conversion zone (204). A thermally cracked product (206) is removed from the thermal conversion zone (200) and is conducted to a fractionator (208). The fractionator (208) contains a divided wall (210) rising from the bottom of fractionator (208) to a height of about 75% to 95% of the height of the fractionator (208) and thereby forming separate chambers (212) and (214). The fractionator (208) contains a plurality of distillation devices (not shown) throughout most of the height of the fractionator including in the separate chambers (212) and (214). These distillation devices are perforated to allow passage of vapors and liquids, and are the means for accomplishing distillation and therefore separation of liquids of differing boiling points. A thermally cracked bottoms stream (216) is conducted to the reactor riser (218) of an FCC reactor (220) where it contacts a fluidized catalyst and is cracked to lower boiling products. The FCC cracked products are separated from the catalyst in cyclones (not shown) and separated cracked products (224) are conducted to fractionator (208). The FCC cracked products enter the fractionator (208) at a point of the fractionator located below the top of divided wall (210). Spent catalyst (228) is sent to the regenerator (226) where it is regenerated under regenerating conditions. Regenerated catalyst is returned reactor riser (218) through the catalyst return line (230). The fractionator (208) separates products from the FCC reactor (220) as well as products from the thermal conversion zone (204) into a co-mingled naphtha comprised of a separate thermally cracked naphtha, a separate catalytically cracked naphtha, a separate thermally cracked distillate, a separate catalytically cracked distillate, and separate catalytically cracked bottoms and thermally cracked bottoms.

A fractionator overhead product (232), preferably comprising light cat naphtha range hydrocarbons as well as $C_4$-hydrocarbons, is removed from the fractionator (208). Herein, the term "light cat naphtha" is meant as hydrocarbons streams having boiling points in the range for about 15 to about 95° C. (59° F. to 203° F.). A thermally cracked naphtha (234) is removed from the fractionator (208). The thermally cracked naphtha (234) may be recovered as a thermally cracked naphtha product (250) or optionally, a portion of the thermally cracked naphtha (252) may be recycled to reactor riser (218). A catalytically cracked naphtha (236) is removed from the fractionator (208). The catalytically cracked naphtha (236) may be recovered as a catalytically cracked naphtha product (254) or optionally, a portion of the catalytically cracked naphtha (256) may be recycled to reactor riser (218). Continuing with FIG. 3, a thermally cracked distillate product (238) and a catalytically cracked distillate product (240) are removed from the fractionator (208). If the catalyst in the FCC reactor includes ZSM-5, $C_3/C_4$ olefin production may be enhanced by recycling at least a portion of the naphtha products (252) and/or (256). In an additional embodiment, the feedstream to the reactor riser (218) may be supplemented by additional FCC hydrocarbon feedstreams (258).

The following examples will illustrate the improved process for processing a hydrocarbon feed having a CCR of about 0 to 6 wt % by first thermally cracking the feedstream followed by catalytically converting at least a portion of the thermally cracked products in an FCC according to the present invention, but are not meant to limit the invention in any fashion.

EXAMPLES

Comparison to FCC only and thermal cracking plus FCC were accomplished by taking thermal cracking yields and combining them with the FCC yields. This is done by normalizing the FCC yields of the thermal bottoms by multiplying them by the weight fraction yield from the thermal cracking. The normalized bottoms distillate, gasoline and gas were then added to the yield from the thermal cracking to get the combined thermal and FCC yields. These combined vs. thermal cracked yields are presented in FIGS. 4 through 6 at the same bottoms conversion. The VGO feeds tested were a standard virgin paraffinic VGO, a naphthenic VGO and hydrotreated naphthenic VGO. All the data in the Examples show a clear shift from naphtha to distillate with process of the present invention. Mass spectrometric correlations show that a higher quality of the distillate product is obtained from the thermal cracking than from the catalytic cracking. If the thermally cracked distillate is segregated and removed prior to catalytic cracking step, it can be blended into a high quality diesel fuel. However, if the thermally cracked and the thermally cracked/catalytically cracked distillate products of the present invention are combined, the resulting diesel product still has a higher quality than typical FCC light cycle oil at the same bottoms conversion.

Example 1

General Procedure for Thermal Cracking Experiments

The general procedure for thermal cracking is set forth in this example. A 300 ml autoclave is charged with a VGO feed, flushed with nitrogen and heated to 100° C. (212° F.). The vessel is pressurized with nitrogen to about 670 psig (4,619 kPa) and pressure maintained using a mitey-mite pressure regulator. In this configuration, there is no gas flow through the autoclave, but if the pressure exceeds the set pressure, some vapors will leave the autoclave and be collected in a cooled knockout vessel downstream. The temperature is raised to the target level and the feed held at that temperature with stirring for the target time. The vessel is cooled and the pressure reduced, then purged with nitrogen for 30 minutes to remove any 343° C.–(650° F.⁻) products that formed. These light liquids are collected in a knockout vessel cooled to 0° C. (32° F.) located downstream of the autoclave. The oil remaining in the autoclave is cooled to about 150° C. (302° F.) and filtered through #42 paper to collect and quantify any solids that may have formed. Any solids collected on the filter were washed with toluene until the filtrates were colorless.

Example 2

The procedure outlined in Example 1 was followed for the thermal treatment of a VGO. To the 300 ml autoclave, 130.0 g of a VGO feed was added, the autoclave sealed, flushed with nitrogen and heated to 100° C. (212° F.). Nitrogen was added to maintain a pressure of 670 psig (4,619 kPa). The autoclave heated to 410° C. (770° F.) and held at that temperature for 95 minutes. This is a severity of 250 equivalent seconds at 468° C. (875° F.). This corresponds to a severity of 2190 equivalent seconds at 427° C. (800° F.).

Following the procedures of Example 1, 33.5 g of light 343° C.– (650° F.⁻) liquids were collected in the knockout vessel, 90.0 g of 343° C.+ (650° F.⁺) liquids were collected after filtration, and 6.5 g of gas were determined (by difference). Approximately 61 w ppm of toluene insolubles were collected. The liquids had the following properties shown in Table 1.

TABLE 1

|  | VGO feed | 343° C.+ | 343° C.– |
|---|---|---|---|
| % C | 85.94 | 86.61 | 85.27 |
| % H | 12.7 | 12.18 | 13.71 |
| % N | 0.08 | 0.24 | 0.00 |
| % S | 0.95 | 1.15 | 0.50 |
| MCR, % | 0.49 | 2.18 | 0 |

NOTE:
In Table 1, MCR is Microcarbon residue. Microcarbon residue is determined by test method ASTM D4530, Standard Test Method for Determination of Carbon Residue (Micro Method).

Example 3

General Procedure for Fluid Catalytic Cracking Experiments

The general method for FCC testing is set forth in this example. Base case FCC simulations were run in a P-ACE reactor from Kayser Associates equipped with a fixed bed reactor. Prior to the start of the ACE testing, the ACE feed system is flushed with toluene to minimize contamination of the system. The feed is poured into a 2 oz. bottle and placed in the ACE feed preheater to allow the feed to come to the designated preheat temperature. Once at temperature, the feed pump is calibrated to ensure that the appropriate amount of feed is injected into the reactor according to the planned feed injection rate. The chosen FCC catalyst is charged into the unit according to the established procedures. Once the catalyst has been charged, the ACE unit runs are initiated. Each catalyst charge results in six separate experiments that are sequentially run during the course of the day. During a run, the feed is injected into the fluidized bed for the designated reaction time depending on the chosen catalyst/oil ratio and feed rate. Each of the liquid products is collected in one of six knock out flasks which are maintained at −5° F. (20.5° C.). The gaseous ($C_{6-}$) products are analyzed directly by gas chromatography, and the liquid products are separately weighed and analyzed by simulated distillation. The coke on the catalyst is burned in-situ and quantified with an on-line $CO_2$ analyzer. The liquid and gas analyzed results are then pulled together and analyzed to produce the final run report.

Example 4

The 343° C.+ (650° F.+) liquids prepared and described in Example 2 were subjected to ACE testing to compare its reactivity to FCC relative to the starting VGO feed. The run conditions were as follows: feed rate=1.33 g/min (@150° F./66° C.), and cat/oil ratios of 3.0, 5.0, and 7.0. Two temperatures, 524° C. (975° F.) and 554° C. (1030° F.) were investigated. The catalyst used was an e-cat representative of an equilibrium FCC catalyst. A summary of representative data (4 runs total) is provided in the following table. The data are presented in pairs to emphasize the comparison of the results obtained by catalytic cracking alone versus those obtained by the combined thermal and catalytic cracking processes. The combined thermal treatment runs have been renormalized to include the liquid and gas products produced during the thermal treatment. The results are shown in Table 2.

TABLE 2

| | Catalytic Treating Only | Combined Thermal & Catalytic Treating | Catalytic Treating Only | Combined Thermal & Catalytic Treating |
| --- | --- | --- | --- | --- |
| | Run Number | | | |
| | 1 | 2 | 3 | 4 |
| Feedstock | VGO | VGO | VGO | VGO |
| Cracking temperature, deg. F. | 1033.3 | 1031 | 1033.3 | 1032.4 |
| Feed injection time, sec. | 32 | 32 | 45 | 45 |
| Feed injector ID | 1.125 | 1.125 | 1.125 | 1.125 |
| Regen temperature, deg. F. | 1250 | 1250 | 1250 | 1250 |
| Reduction step (yes/no) | NO | NO | NO | NO |
| Catalyst/Oil ratio | 7.1 | 7.1 | 5.0 | 5.0 |
| Relative contact time | 0.5 | 0.5 | 0.5 | 0.5 |
| Conversion, 430 deg. F. | 73.4 | 64.2 | 72.1 | 62.7 |
| Conversion, 650 deg F. | 87.2 | 85.3 | 86.4 | 84.3 |
| Yields, wt % FF [1] | | | | |
| H2S | 0.37 | 0.32 | 0.37 | 0.32 |
| H2 | 0.18 | 0.17 | 0.17 | 0.16 |
| CH4 | 0.95 | 0.83 | 0.90 | 0.81 |
| C2H4 | 0.83 | 0.62 | 0.78 | 0.58 |
| C2H6 | 0.51 | 0.45 | 0.52 | 0.47 |
| C3H6 | 6.15 | 3.86 | 5.96 | 3.70 |
| C3H8 | 1.14 | 0.79 | 1.10 | 0.75 |
| Butadiene | 0.06 | 0.05 | 0.07 | 0.05 |
| Butene-1 | 1.46 | 0.92 | 1.53 | 0.96 |
| i-Butene | 2.10 | 1.21 | 2.15 | 1.25 |
| t-2-Butene | 1.94 | 1.21 | 2.01 | 1.23 |
| c-2-Butene | 1.40 | 0.88 | 1.46 | 0.89 |
| i-Butane | 3.83 | 2.27 | 3.66 | 2.06 |
| n-Butane | 0.89 | 0.58 | 0.88 | 0.56 |
| C5-430 | 46.98 | 41.25 | 47.15 | 41.04 |
| LCCO | 13.78 | 21.04 | 14.29 | 21.60 |
| BTMS | 12.84 | 14.74 | 13.57 | 15.74 |
| Coke | 4.59 | 5.29 | 3.44 | 4.31 |
| Dry gas | 2.84 | 2.39 | 2.75 | 2.35 |
| Total butenes | 6.96 | 4.26 | 7.22 | 4.38 |
| Material balance, wt % FF | 101.20 | 103.50 | 101.80 | 101.30 |

Figure 4:
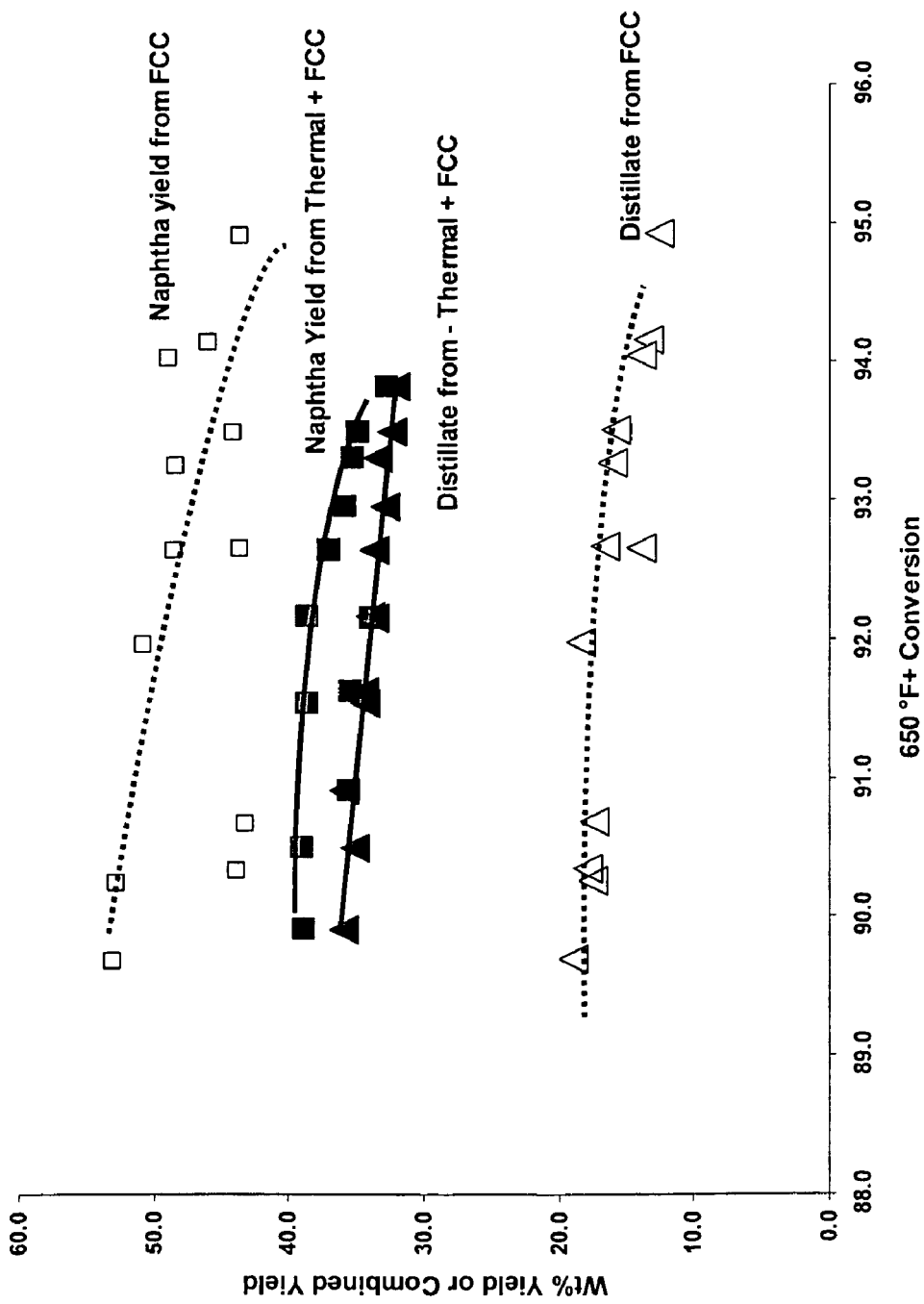
FIG. 4 is a graph showing a comparison of naphtha and distillate yields from a catalytically cracked only paraffinic VGO feed vs. a thermally cracked+catalytically cracked paraffinic VGO feed of the present invention.

NOTE
[1] Combined Thermal & Catalytic Treating data of Runs 2 and 4 have been renormalized FIG. 4 illustrates the comparison of results from a catalytically treated only paraffinic VGO and the thermally treated+catalytically cracked paraffinic VGO of the present invention. In FIG. 4, the darker curves (solid lines & solid data points) show the resulting naphtha and distillate yields from the process of the present invention. The lighter curves (dashed lines & hollow data points) show the resulting naphtha and distillate yields from catalytic cracking processing only. As can be seen in FIG. 4, the naphtha yield from present invention has been significantly reduced and the distillate yield from the present invention has been significantly increased resulting in a significantly improved distillate production from the process of the present invention. Also, while not shown in FIG. 4, the coke bottoms and $C_4$-yields were not significantly different from the between the two processes.

Example 5

A naphthenic VGO was treated as described in Examples 1-4.

Figure 5:
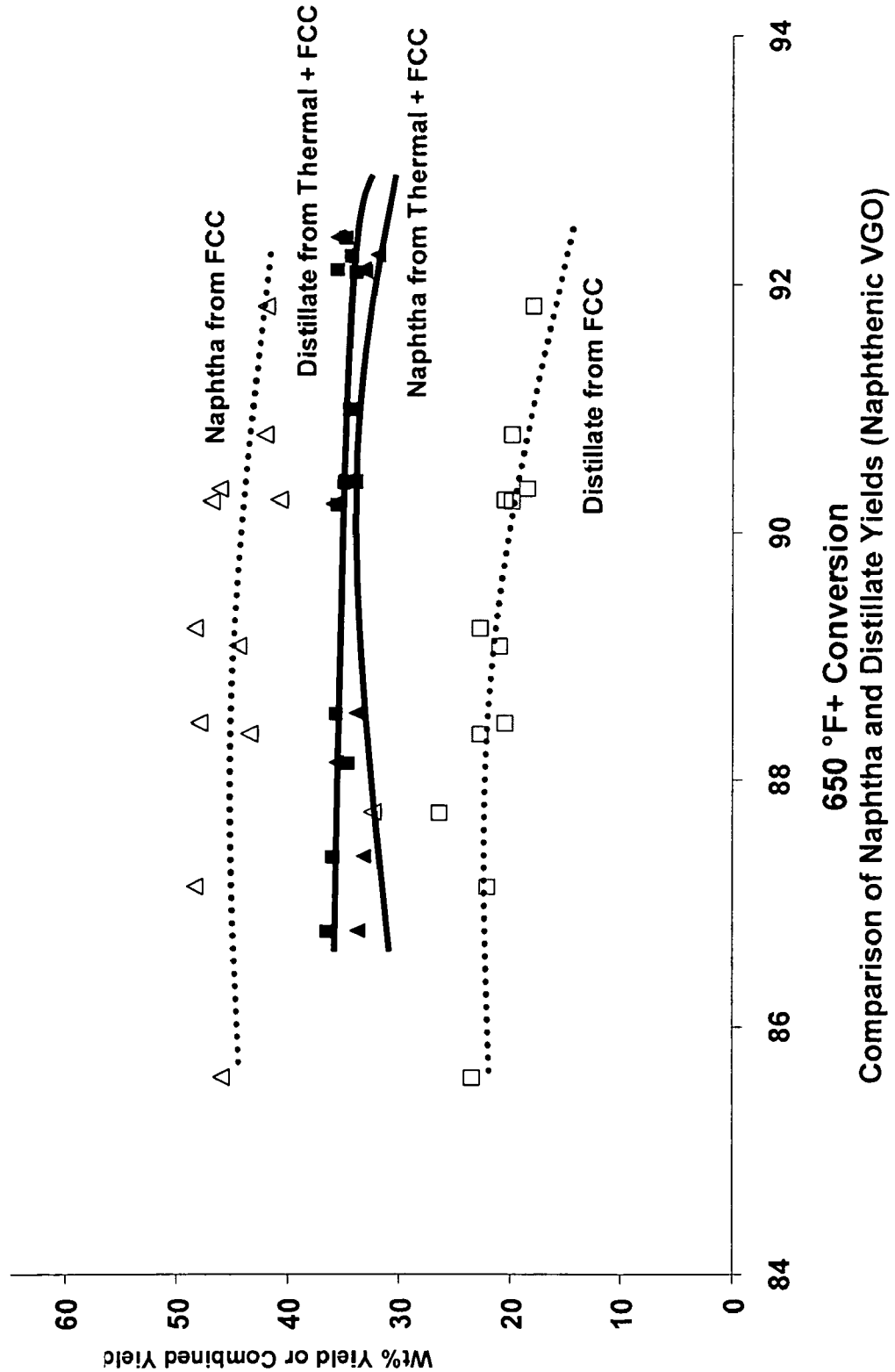
FIG. 5 is a graph showing a comparison of naphtha and distillate yields from a catalytically cracked only naphthenic VGO feed vs. a thermally cracked+catalytically cracked naphthenic VGO feed of the present invention.

FIG. 5 illustrates the comparison of results from a catalytically treated only naphthenic VGO and a thermally treated+ catalytically cracked naphthenic VGO of the present invention. In FIG. 5, the darker curves (solid lines & solid data points) show the resulting naphtha and distillate yields from the process of the present invention. The lighter curves (dashed lines & hollow data points) show the resulting naphtha and distillate yields from catalytic cracking processing only. As can be seen in FIG. 5, the naphtha yield from present invention has been significantly reduced and the distillate yield from the present invention has been significantly increased resulting in a significantly improved distillate production from the process of the present invention. Also, while not shown in FIG. 5, the coke bottoms and $C_4$-yields were not significantly different from the between the two processes.

Example 6

In this example, the naphthenic VGO of Example 5 was hydrotreated under standard hydrodesulfurization conditions and the product VGO from the hydrotreating was treated as in Examples 1-4.

Figure 6:
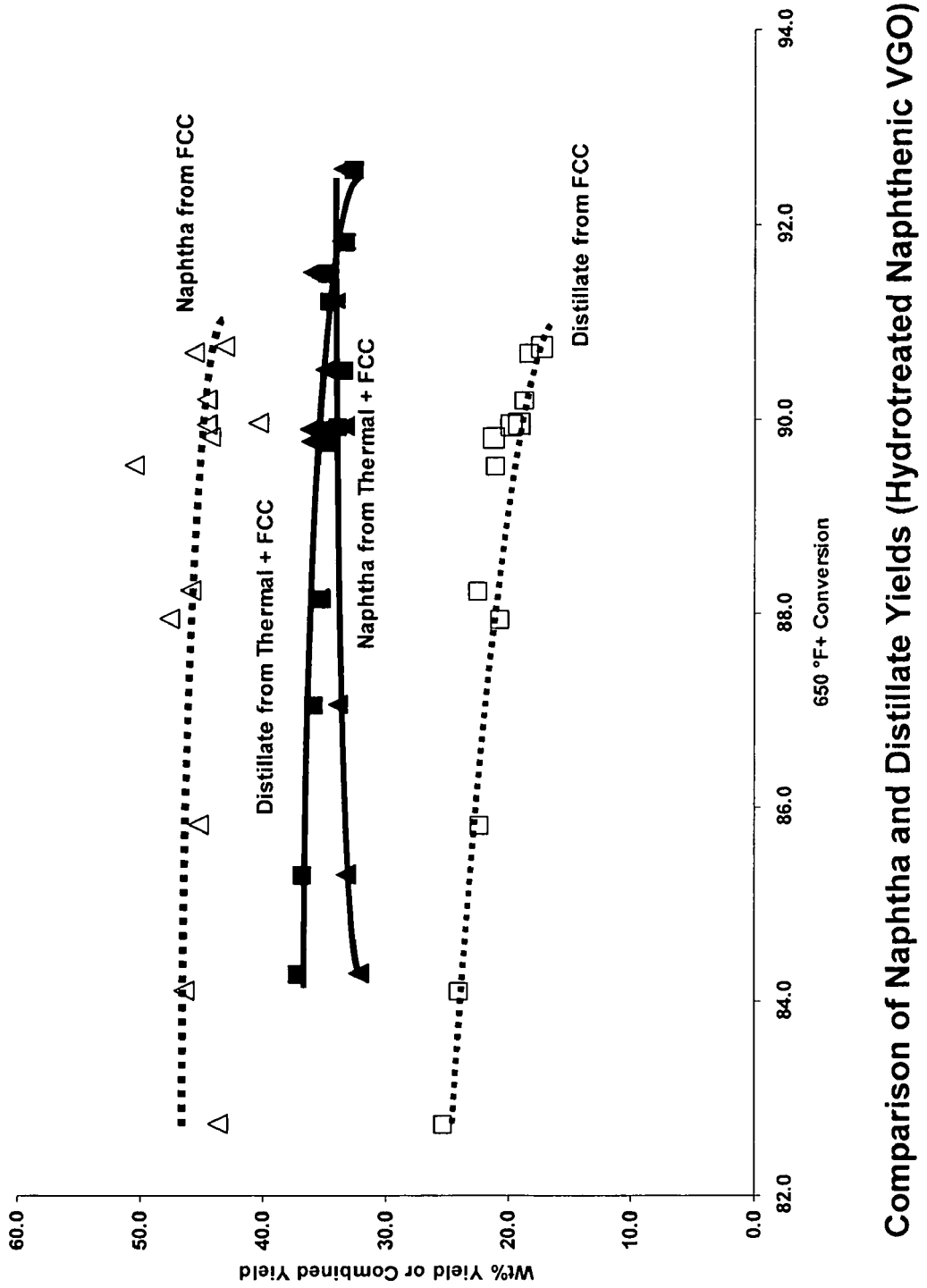
FIG. 6 is a graph showing a comparison of naphtha and distillate yields from a catalytically cracked only hydrotreated naphthenic VGO feed vs. a thermally cracked+catalytically cracked hydrotreated naphthenic VGO feed of the present invention.

FIG. 6 illustrates the comparison of results from a catalytically cracked only hydrotreated naphthenic VGO and a thermally treated+catalytically cracked hydrotreated naphthenic VGO of the present invention. In FIG. 6, the darker curves (solid lines & solid data points) show the resulting naphtha and distillate yields from the process of the present invention. The lighter curves (dashed lines & hollow data points) show the resulting naphtha and distillate yields from a catalytic cracking processing (w/prior hydrotreating) only. As can be seen in FIG. 6, the naphtha yield from present invention has been significantly reduced and the distillate yield from the present invention has been significantly increased resulting in a significantly improved distillate production from the process of the present invention. Also, while not shown in FIG. 6, the coke bottoms and $C_4$-yields were not significantly different from the between the two processes.

What is claimed is:

1. A thermal and catalytic conversion process for converting a hydrocarbon feed having a Conradson Carbon Residue ("CCR") content of from 0 to 6 wt. %, based on the hydrocarbon feed, which comprises:
    a) processing the hydrocarbon feed in a thermal conversion zone under effective thermal conversion conditions to produce a thermally cracked product;
    b) conducting at least a portion of the thermally cracked product to a fractionator containing a divided wall;
    c) using the divided wall portion of the fractionator to separate a thermally cracked bottoms;
    d) conducting at least a portion of the thermally cracked bottoms to a fluid catalytic cracking reactor;
    e) catalytically converting the thermally cracked bottoms under effective fluid catalytic cracking conditions to produce a catalytically cracked product;
    f) conducting the catalytically cracked product to the fractionator at a point below the uppermost portion of the divided wall wherein a portion of the catalytically cracked product is co-mingled with a thermally cracked distillate and a thermally cracked naphtha; and
    g) separating a co-mingled naphtha, a co-mingled distillate, and a catalytically cracked bottoms from the fractionator;
    wherein the catalytically cracked bottoms is segregated from the thermally cracked bottoms utilizing the divided wall portion of the fractionator.

2. The process of claim 1, wherein at least a portion of the co-mingled naphtha is recycled to the fluid catalytic cracking reactor.

3. A thermal and catalytic conversion process for converting a hydrocarbon feed having a Conradson Carbon Residue ("CCR") content of from 0 to 6 wt. %, based on the hydrocarbon feed, which comprises:
    a) processing the hydrocarbon feed in a thermal conversion zone under effective thermal conversion conditions to produce a thermally cracked product;
    b) conducting at least a portion of the thermally cracked product to a fractionator containing a divided wall;
    c) using the divided wall portion of the fractionator to separate a thermally cracked bottoms;
    d) conducting at least a portion of the thermally cracked bottoms to a fluid catalytic cracking reactor;
    e) catalytically converting the thermally cracked bottoms under effective fluid catalytic cracking conditions to produce a catalytically cracked product;
    f) conducting the catalytically cracked product to the fractionator at a point below the uppermost portion of the divided wall wherein a portion of the catalytically cracked product is co-mingled with a thermally cracked naphtha; and
    g) separating a co-mingled naphtha, a thermally cracked distillate, a catalytically cracked distillate, and a catalytically cracked bottoms from the fractionator;
    wherein the thermally cracked distillate is segregated from the catalytically cracked distillate, and the catalytically cracked bottoms is segregated from the thermally cracked bottoms utilizing the divided wall portion of the fractionator.

4. The process of claim 3, wherein at least a portion of the co-mingled naphtha is recycled to the fluid catalytic cracking reactor.

5. A thermal and catalytic conversion process for converting a hydrocarbon feed having a Conradson Carbon Residue ("CCR") content of from 0 to 6 wt. %, based on the hydrocarbon feed, which comprises:
    a) processing the hydrocarbon feed in a thermal conversion zone under effective thermal conversion conditions to produce a thermally cracked product;
    b) conducting at least a portion of the thermally cracked product to a fractionator containing a divided wall;
    c) using the divided wall portion of the fractionator to separate a thermally cracked bottoms;
    d) conducting at least a portion of the thermally cracked bottoms to a fluid catalytic cracking reactor;
    e) catalytically converting the thermally cracked bottoms under effective fluid catalytic cracking conditions to produce a catalytically cracked product;
    f) conducting the catalytically cracked product to the fractionator at a point below the uppermost portion of the divided wall; and
    g) separating a thermally cracked naphtha, a catalytically cracked naphtha, a thermally cracked distillate, a catalytically cracked distillate, and a catalytically cracked bottoms from the fractionator;
    wherein the thermally cracked naphtha is segregated from the catalytically cracked naphtha, the thermally cracked distillate is segregated from the catalytically cracked distillate, and the catalytically cracked bottoms is segregated from the thermally cracked bottoms utilizing the divided wall portion of the fractionator.

6. The process of claims 1, 3 or 5 wherein the hydrocarbon feed is comprised of a vacuum gas oil.

7. The process of claim 6 wherein at least a portion of the vacuum gas oil is hydrotreated.

8. The process of claim 2, wherein at least a portion of the thermally cracked naphtha is recycled to the fluid catalytic cracking reactor.

9. The process of claim 2, wherein at least a portion of the catalytically cracked naphtha is recycled to the fluid catalytic cracking reactor.

10. The process of claims 1, 3, or 5 wherein the fluid catalytic cracking reactor contains a catalyst comprised of ZSM-5.

11. The process of claims 1, 3 or 5 wherein at least a portion of the thermally cracked bottoms is hydrotreated prior to being conducted to the fluid catalytic cracking reactor.

12. The process of claims 1, 3 or 5 wherein the thermal converter is operated at severities in the range of 25-450 equivalent seconds at 468° C.

* * * * *